US008269720B2

United States Patent
Yang et al.

(10) Patent No.: US 8,269,720 B2
(45) Date of Patent: Sep. 18, 2012

(54) INPUT DEVICE HAVING THE FUNCTION OF RECOGNIZING HYBRID COORDINATES AND OPERATING METHOD OF THE SAME

(75) Inventors: Hong Young Yang, Seoul (KR); Seung Gol Lee, Incheon (KR); Chang Hee Cho, Bucheon (KR)

(73) Assignee: Finger System, Inc., Bucheon, Kyunggi-do (KR)

( * ) Notice: Subject to any disclaimer, the term of this patent is extended or adjusted under 35 U.S.C. 154(b) by 1278 days.

(21) Appl. No.: 11/884,690

(22) PCT Filed: Feb. 17, 2006

(86) PCT No.: PCT/KR2006/000556
§ 371 (c)(1),
(2), (4) Date: Nov. 20, 2007

(87) PCT Pub. No.: WO2006/088332
PCT Pub. Date: Aug. 24, 2006

(65) Prior Publication Data
US 2008/0259029 A1     Oct. 23, 2008

(30) Foreign Application Priority Data
Feb. 18, 2005 (KR) .......................... 10-2005-0013455

(51) Int. Cl.
*G09G 5/08* (2006.01)

(52) U.S. Cl. ........ 345/158; 345/161; 345/163; 345/173; 345/179; 178/19.01

(58) Field of Classification Search .................. 345/158, 345/161, 163, 173, 179
See application file for complete search history.

(56) References Cited

U.S. PATENT DOCUMENTS
4,878,249 A    10/1989   Mifune et al.
(Continued)

FOREIGN PATENT DOCUMENTS
JP          63-082584           4/1988
(Continued)

OTHER PUBLICATIONS
Co-pending U.S. Appl. No. 11/792,871, filed Jun. 12, 2007.

*Primary Examiner* — William Boddie
*Assistant Examiner* — Leonid Shapiro
(74) *Attorney, Agent, or Firm* — Hamre, Schumann, Mueller & Larson, P.C.

(57) ABSTRACT

The present invention relates a coordinate input device to input a variety of job commands, diagrams or characters, and to store or output the input data. More particularly, the present invention provides an input device for recognizing hybrid coordinates and a method of operating the device. The input device uses an absolute coordinate recognition method and a relative coordinate recognition method in a combined fashion as a coordinate recognition method for inputting the track of the characters or diagrams. By doing so, input coordinates are converted into absolute coordinates, and the tracks of handwritten characters and diagrams are stored as the converted absolute coordinates such that the tracks are displayed on a display of the input device or on a monitor of an information terminal connected to the input device. Accordingly, problems of respective conventional input devices for recognizing coordinates can be solved, the structure of hardware can be simplified, and characters or diagrams can be input with accurate recognition of coordinates.

18 Claims, 3 Drawing Sheets

U.S. PATENT DOCUMENTS

| | | | |
|---|---|---|---|
| 5,859,646 A | | 1/1999 | Takenaka |
| 6,029,214 A | * | 2/2000 | Dorfman et al. ................ 710/73 |
| 472,240 A1 | | 3/2003 | Seog |
| 7,098,894 B2 | | 8/2006 | Yang et al. |
| 2004/0123001 A1 | * | 6/2004 | Kikuchi et al. ................ 710/72 |
| 2006/0031755 A1 | * | 2/2006 | Kashi ............................ 715/512 |
| 2008/0296074 A1 | * | 12/2008 | Hollstron et al. .......... 178/19.01 |

FOREIGN PATENT DOCUMENTS

| | | |
|---|---|---|
| JP | 06-348857 | 12/1994 |
| JP | 09-171565 | 6/1997 |
| JP | 10-124251 | 5/1998 |
| JP | 2000-227835 | 8/2000 |
| KR | 10-1995-1542 | 1/1994 |
| KR | 10-1988-4400 | 6/1998 |
| KR | 10-1998-080305 | 11/1998 |
| KR | 10-1999-0080936 | 11/1999 |
| WO | WO 01/01670 | 1/2001 |
| WO | WO 01/16691 | 3/2001 |
| WO | WO 01/26032 | 4/2001 |
| WO | WO 01/26033 | 4/2001 |
| WO | WO 01/48685 | 7/2001 |
| WO | WO 01/71471 | 9/2001 |
| WO | WO 01/71473 | 9/2001 |
| WO | WO 01/75779 | 10/2001 |
| WO | WO 01/75781 | 10/2001 |

* cited by examiner

[Fig. 1]
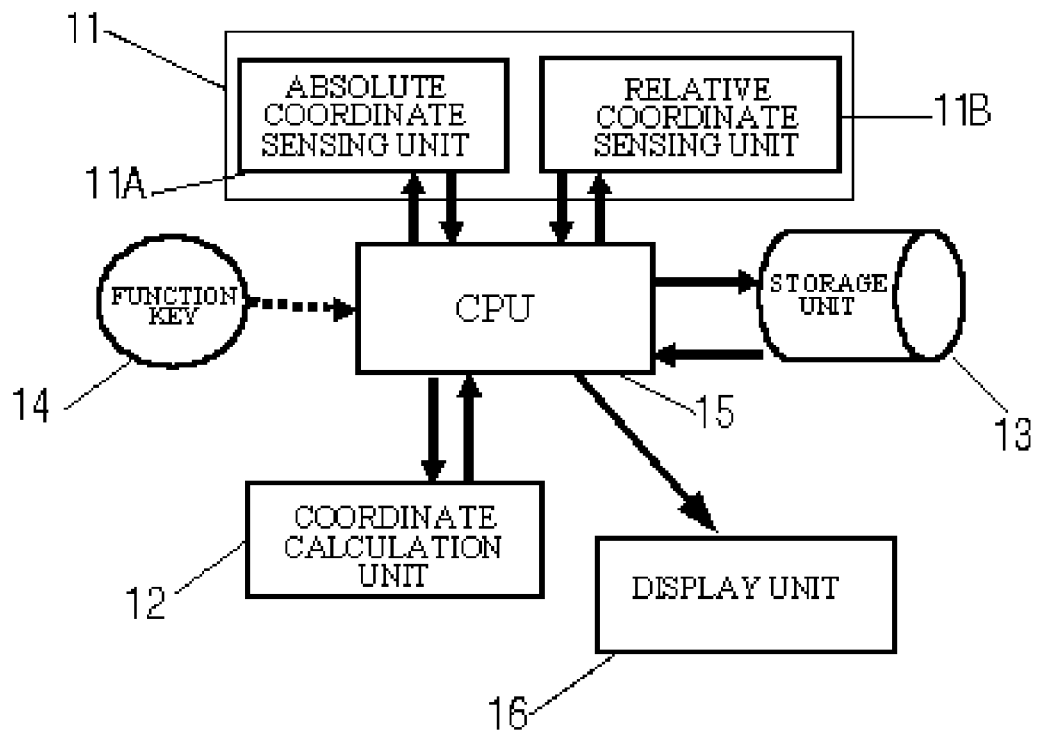
[Fig. 2]
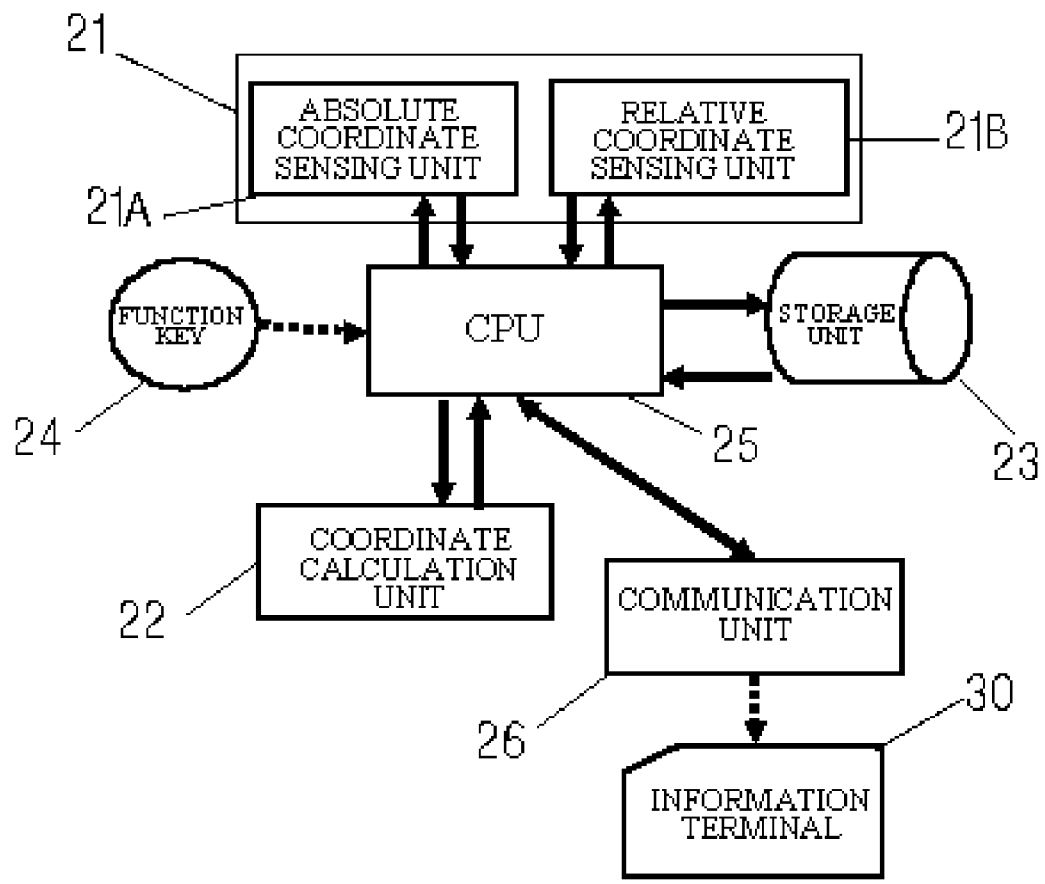

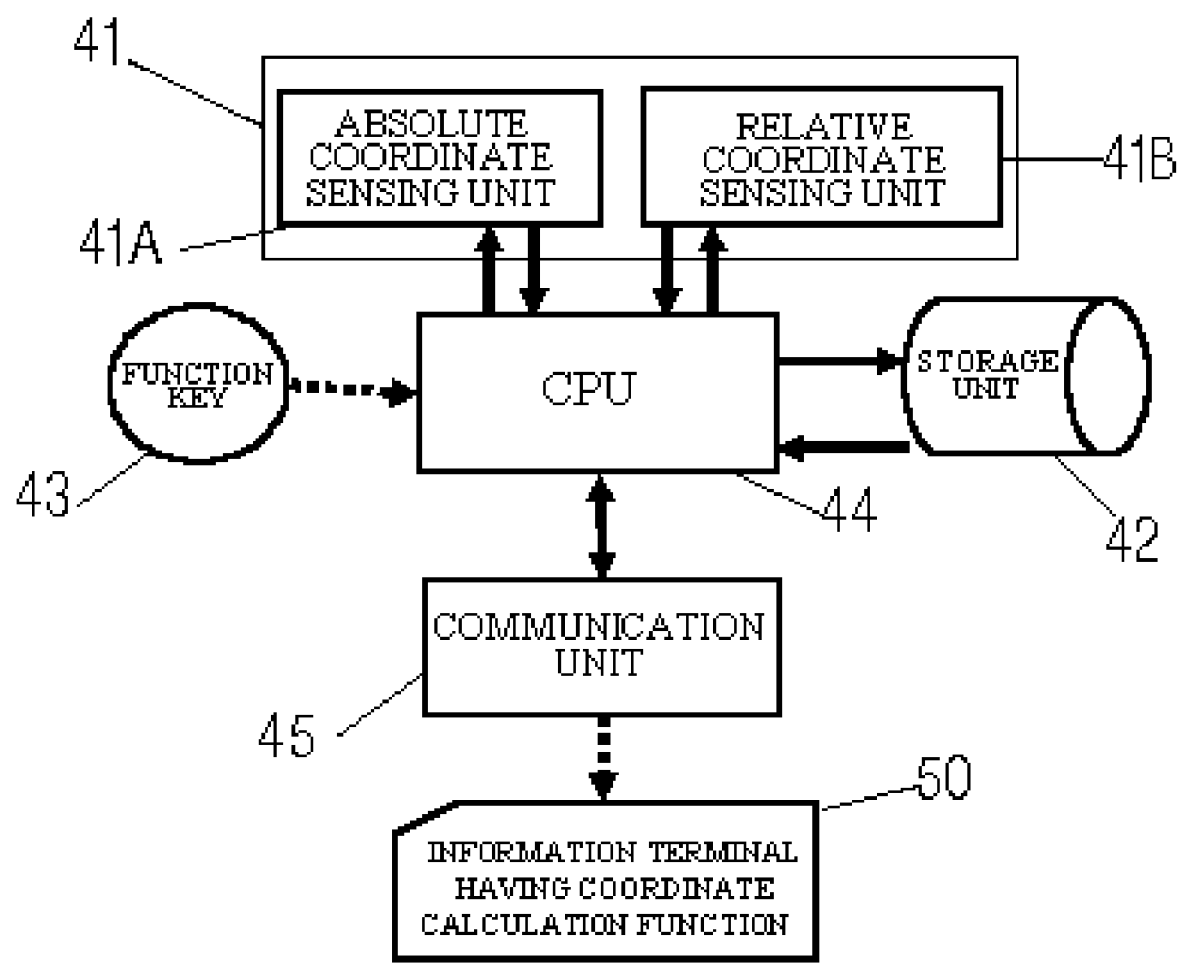
[Fig. 3]

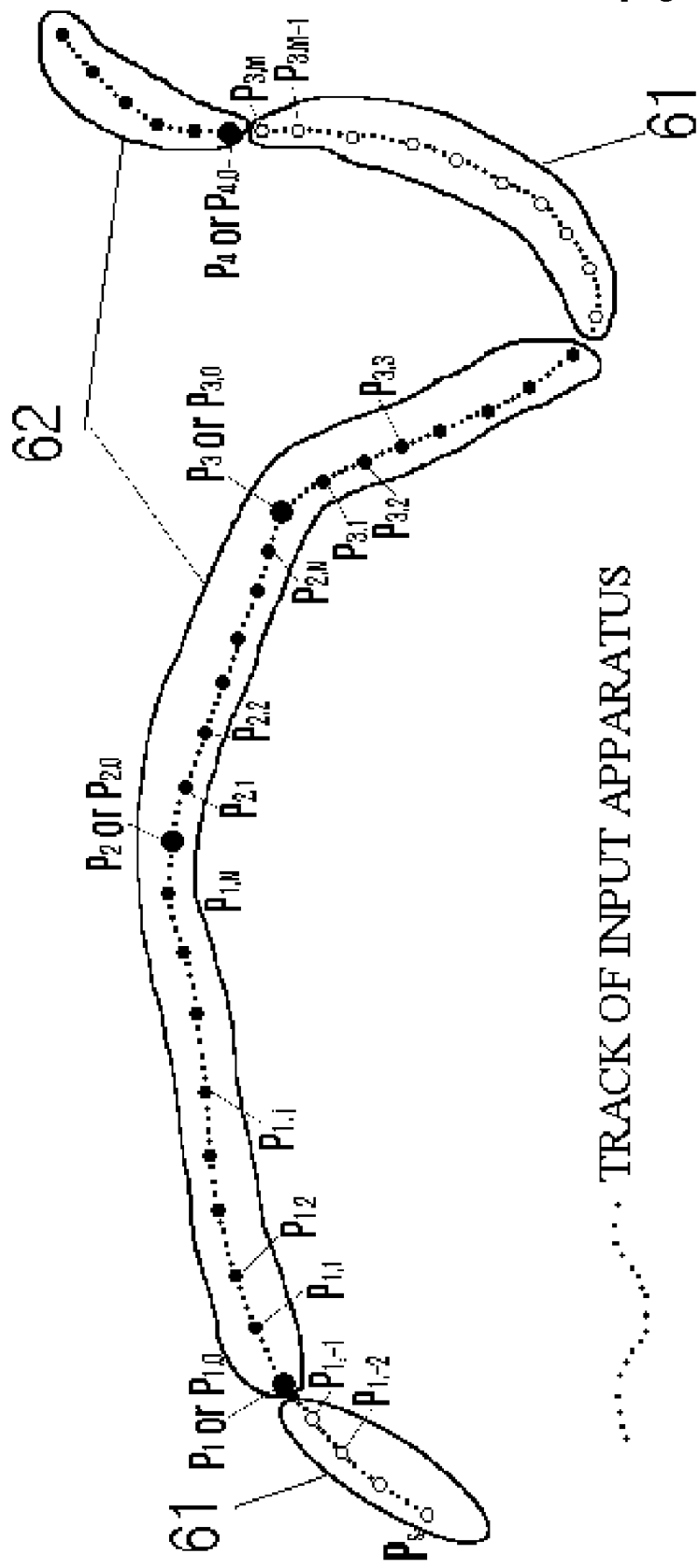
[Fig. 4]

INPUT DEVICE HAVING THE FUNCTION OF RECOGNIZING HYBRID COORDINATES AND OPERATING METHOD OF THE SAME

TECHNICAL FIELD

The present invention relates to a coordinate input device to input a variety of job commands, diagrams or characters, and to store or output the input data. More particularly, the present invention provides an input device for recognizing hybrid coordinates and a method of operating the device. The input device uses an absolute coordinate recognition method and a relative coordinate recognition method in a combined fashion as a coordinate recognition method for inputting the track of the characters or diagrams. By doing so, the relative coordinates obtained by the relative coordinate recognition method are converted into absolute coordinates, using the absolute coordinates obtained by the absolute coordinate recognition method, and the tracks of handwritten characters and diagrams are stored as the obtained absolute coordinates and the converted absolute coordinates such that the tracks are displayed on a display of the input device or on a monitor of an information terminal connected to the input device. Accordingly, problems of respective conventional input devices based on the absolute coordinate recognition method or the relative coordinate recognition method can be solved, the structure of hardware can be simplified, and characters or diagrams can be input with accurate recognition of coordinates.

BACKGROUND ART

Generally, a mouse is used as a device which is connected to a computer to specify a position for a job on a monitor or to input a command. A coordinate recognition method used to move a cursor on the monitor with respect to the track of the movement of the mouse is broken down into a relative coordinate recognition method and an absolute coordinate recognition method.

The relative coordinate recognition method is applied to a ball mouse or optical mouse in an ordinary form. A relative position is obtained by calculating the amounts of relative movement from the previous position to a current position, by using a ball-type or an optical-type sensing devices to sense the amount of position movement without pattern paper or an auxiliary device.

Since the ball or optical mouse to which the relative coordinate recognition method is applied can operate without specific pattern paper or an auxiliary device, the structure of the mouse is simple, portable, and relatively has no restriction in use. Also, since the structure of hardware is relatively simple, it is cost-efficient.

Next, a mouse using the absolute coordinate recognition method recognizes a position by using specific pattern paper or an auxiliary device (tablet type device, ultrasonic type device, etc.). The movement track of the mouse can be detected as absolute coordinates. Mostly, the absolute coordinate recognition mice are pen types.

Since the mouse to which the absolute coordinate recognition method is applied detects an absolute position by the help of a specific additional device, it can always detect an absolute position even without having previous data.

For example, in a method of recognizing absolute coordinates by using specific pattern paper, each microcode(position-coding pattern) recorded on the pattern paper (in which a specific pattern corresponding to the absolute coordinates of each microcode is printed) is recognized such that a current position of a mouse can be absolutely recognized. Accordingly, in order to recognize the track of the mouse, microcodes indicating the absolute positions of respective points on a track of the moving mouse should be continuously distributed on the track.

Also used is an electronic pen by which a handwritten diagram or character is stored along the track of the pen, and when the pen is connected to an information terminal later, the stored contents are output on the monitor of the information terminal.

DISCLOSURE

Technical Problem

However, the mouse to which the relative coordinate recognition method is applied as described above cannot know an absolute position when a position is recognized. Since it obtains only information on how much and in which direction the position of a ball or light is moving currently, if the position of the mouse is changed while the mouse is not used, the position of the cursor will deviate from the position where a job was processed.

Accordingly, in order to find the position where the job was processed, the position of the cursor on the monitor should be moved many times with confirming the position with naked eyes, and thus it is difficult to find the original position of the cursor. In particular, if the mouse is used not only to control a computer, but also to input specific characters or diagrams, a process to return to a state before the job is stopped is very annoying. Also, the absolute position of the mouse cannot be known and therefore it cannot be known in which part of the entire paper the characters or diagrams were being written.

In addition, the mouse to which the relative coordinate recognition method is applied can recognize the relative coordinates with respect to the movement only when the mouse is moved with constantly touching the surface. If the mouse is lifted up and moved, the cursor on the monitor does not move. Accordingly, in order to find the position of a job on the monitor, the mouse should be moved with always touching the surface.

Also, the absolute coordinate recognition method described above requires pattern paper on which a predetermined pattern is printed, or a specific additional device. Accordingly, the method is not suitable for a portable application, the range of its application is very limited, and the resolution of the method is relatively lower than that of the relative coordinate recognition method. In particular, since the pattern paper needs printing of very fine microcodes, the optical system and sensor of an absolute coordinate recognition apparatus should be a high performance expensive one, and because of the large size of image data to be processed, a higher performance microprocessor is needed. Also, since a process of printing a fine microcode should be precise, the pattern paper cannot be manufactured easily.

In addition, compared to the mouse used in the position recognition using relative coordinates, the absolute coordinate recognition method requires an auxiliary device. Accordingly, the structure of hardware for the mouse is complicated and necessarily requires high-end specifications. As a result, the volume of the mouse increases causing inconvenience in portability, and the mouse becomes inefficient compared to the relative coordinate type mouse.

Furthermore, errors of recognition of absolute coordinate may happen due to damages in microcodes on pattern paper, distortion of the image of a microcode by a microcode sensing means, or rotation of a mouse, and etc. In this case, input information will have serious errors and there is no alternative to correct the incorrectly input information.

Also, in case where the electronic pen is used for the method of recognizing relative coordinates, if a simple memo is written and then, after a while a memo is desired to be added, the position of the end of the previous memo cannot be known. Accordingly, it is fundamentally impossible to process long memos.

In addition, in case where the electronic pen is used for the method of recognizing absolute coordinates, an absolute position is detected through a predetermined auxiliary device such that even though previous data is not kept, accurate absolute position can always be detected and memos written with time intervals or long memos can be processed. However, since pattern paper on which a predetermined pattern is printed and the predetermined auxiliary devices are always needed, it causes inconvenience in portability, and the range of its application is very limited. Also, compared to the electronic pen used for the relative coordinate type method of recognizing a position, the pen for the absolute coordinate recognition method requires an auxiliary device such that the structure of hardware is complicated, high-end specifications are required, and the volume increases inevitably.

Technical Solution

The present invention is to solve the problems described above by applying both a relative coordinate recognition method and an absolute coordinate recognition method to a coordinate input device such as a conventional mouse or electronic pen.

According to the present invention, the relative coordinate recognition method and the absolute coordinate recognition method are combined to complement each other so that errors of the relative coordinate recognition method are complemented by the absolute coordinate recognition method or errors of the absolute coordinate recognition method are complemented by the relative coordinate recognition method, and finally all track information is recognized as absolute coordinates to store or output shown characters or diagrams.

Also, the present invention provides a hybrid coordinate recognition input device with good portability and an operating method therefor in which even though the structure of hardware is simplified using a pattern sensing means having a limited resolution, the high resolution of the relative coordinate recognition method enables recognition of a position with precise absolute coordinates.

Also, according to the present invention, even in a situation where a microcode of pattern paper is damaged or an absolute coordinate recognition method is not driven, coordinates with respect to the track of a hybrid coordinate recognition input device can be recognized by a relative coordinate recognition method so that the application range of a coordinate recognition technology is maximized, an environment to which the device is applied is expanded, and the stable operation of the device is enabled.

Also, according to the present invention, by using an absolute coordinate recognition method and a relative coordinate recognition method in a combined fashion and thereby calculating absolute coordinate values, absolute coordinates can be precisely recognized even with an absolute coordinate recognition method with a low resolution, and therefore the resolution of a microcode printed on pattern paper can be printed at a lower resolution such that printing of pattern paper becomes easier and a user can personally print and use a microcode of a predetermined pattern.

According to an aspect of the present invention, there is provided an input device for recognizing hybrid coordinates in which a variety of commands, characters, and diagrams are input and stored or output, the input device including: a hybrid coordinate sensing unit for obtaining absolute coordinate information with respect to position, and obtaining relative coordinate information by sensing the amount of relative movement with respect to moving track; and a coordinate calculation unit for obtaining the absolute coordinates and relative coordinates from each of the coordinate information items and by using the obtained absolute coordinates, converting the obtained relative coordinates into absolute coordinates.

According to another aspect of the present invention, there is provided a method of recognizing the coordinates using the hybrid coordinate recognition input device, the method including: recognizing relative coordinates the instant the input device is turned on; obtaining absolute coordinate information at predetermined time intervals by operating an absolute coordinate sensing switch unit in the process of recognizing the relative coordinates, and if the absolute coordinate sensing switch unit does not operate, obtaining again only the relative coordinate information; and obtaining absolute coordinates and relative coordinates from the obtained absolute coordinate information and relative coordinate information, respectively, and by using the obtained absolute coordinates, converting the relative coordinates into absolute coordinates.

Advantageous Effects

As described above, the input device for recognizing hybrid coordinates and the operating method according to the present invention recognize absolute coordinates at predetermined intervals in a pen-down state, and in relation to coordinates between the intervals or coordinate values in a pen-up state, the track of the input device is obtained by converting recognized relative coordinates into absolute coordinates. By doing so, an optical system and image sensor having a relatively low resolution can be used. Also, the specifications of hardware can be lowered since the volume of data recognized as absolute coordinates is relatively small. Thus, hardware can be constructed simply with lower manufacturing cost. Accordingly, an input device operating with an absolute coordinate recognition method can be built so that the device can be carried conveniently.

In addition, even though pattern paper on which microcodes to be used for recognizing absolute coordinates are printed is damaged or the method of gripping the input device is incorrect, it can be corrected through relative coordinates and predetermined absolute coordinates such that the precise track of the input device can always be obtained.

Furthermore, relative coordinates recognized from a relative coordinate recognition method having a higher resolution are converted into absolute coordinates using the recognized absolute coordinates such that the tracks of handwritten diagrams or characters are input and then output through a display unit or an information terminal. By doing so, pattern paper having a microcode with a simple shape can be used and also, a user can print and use pattern paper personally. This can also lower cost in relation to the absolute coordinate recognition method.

In addition, since the input device can be operated through recognition of relative coordinates even when a critical error occurs in recognition of absolute coordinates or absolute coordinates cannot be recognized, continuity of jobs can be maintained without immediate replacement of the equipment.

DESCRIPTION OF THE DRAWINGS

FIG. 1 is a schematic block diagram illustrating a structure of an input device for recognizing hybrid coordinates independently operating according to an embodiment of the present invention;

FIG. 2 is a schematic block diagram illustrating an example of an input device for recognizing hybrid coordinates connected to an information terminal according to an embodiment of the present invention;

FIG. 3 is a schematic block diagram illustrating an example of an input device for recognizing hybrid coordinates connected to an information terminal according to another embodiment of the present invention; and FIG. 4 illustrates an example of a track appearing when an input device for recognizing hybrid coordinates according to an embodiment of the present invention operates.

BEST MODE

The present invention will now be described more fully with reference to the accompanying drawings, in which exemplary embodiments of the invention are shown.

First, FIG. 1 is a schematic block diagram illustrating an input device for recognizing hybrid coordinates using both an absolute coordinate recognition method and a relative coordinate recognition method according to an embodiment of the present invention. The coordinate input device is to operate a cursor displayed on a monitor, to input a command, and to input handwritten characters or images, when connected to an information terminal such as a personal computer, or operates independently from an information terminal to input, store and output handwritten characters, tracks, or images. The coordinate input device is composed of a hybrid coordinate sensing unit 11 for obtaining relative coordinate information by sensing the amount of relative movement with respect to the moving track of the coordinate input device, and obtaining absolute coordinate information by using the image of a microcode printed on pattern paper through operation of a switch means, or by using a tablet method or an ultrasonic method; and a coordinate calculation unit 12 for obtaining absolute coordinates and relative coordinates from absolute coordinates and relative coordinates from the absolute coordinate information and relative coordinate information, respectively, obtained by the hybrid coordinate sensing unit 11, and by using the obtained absolute coordinates, converting the relative coordinates into absolute coordinates so that the track of handwritten diagrams or characters can be calculated as absolute coordinates.

Here, the hybrid coordinate sensing unit 11 may be separately composed of an absolute coordinate sensing unit 11A having a switch unit for determining whether or not to operate in order to obtain absolute coordinate information and a relative coordinate sensing unit 11B for obtaining relative coordinate information. The hybrid coordinate sensing unit 11 may further include an optical system having one hybrid imaging system, an image sensor, and an absolute coordinate sensing switch unit so that if an absolute coordinate sensing switch does not operate, only relative coordinate information can be obtained and if the absolute coordinate sensing switch operates, both absolute coordinate information and relative coordinate information can be obtained at the same time.

Also, the coordinate input device is further composed of a storage unit 13 for storing absolute coordinate information and relative coordinate information sensed in the hybrid coordinate sensing unit 11, the sensing time of coordinates, and the coordinate values of handwritten characters or diagrams according to the absolute coordinates obtained by the coordinate calculation unit 12; a function key 14 for inputting a command at predetermined coordinates calculated by the coordinate calculation unit 12; a display unit 16 for outputting and displaying coordinate values obtained with respect to the tracks of handwritten characters or diagrams by the coordinate calculation unit 12 or already stored coordinate values with respect to the tracks of handwritten characters or diagrams as characters or diagrams according to a command input through the function key 14, and a central processing unit (CPU) 15 for controlling the functions of the elements.

The hybrid coordinate recognition input device of FIG. 1 converts diagrams or characters drawn on pattern paper, i.e., memos, into absolute coordinates and stores them in the storage unit 13, and then, when it is needed, outputs the memos through the display unit 16 by manipulating the function key 14 such that the contents of the memos can be confirmed on demand.

FIG. 2 is a schematic block diagram illustrating another embodiment of an input device for recognizing hybrid coordinates according to the present invention, which is to output characters or diagrams inputted by a hybrid coordinate recognition method, to a monitor of an information terminal 30 after being connected to the information terminal 30 without having its own display means. As explained above with reference to FIG. 1, the hybrid coordinate recognition input device of FIG. 2 is composed of a hybrid coordinate sensing unit 21 formed of an absolute coordinate sensing unit 21A and a relative coordinate sensing unit 21B, a coordinate calculation unit 22, a storage unit 23, a function key 24 and a CPU 25, and further includes a communication unit 17 for transmitting the absolute coordinate values of handwritten characters or diagrams obtained by the coordinate calculation unit 22, to the information terminal 30.

The above-stated hybrid coordinate recognition input device having the communication unit 17 can have a function of mouse when operating with being connected to the information terminal 30. Even when it is not connected to the information terminal 30, absolute coordinate values with respect to the tracks of handwritten diagrams or characters can be stored in the storage unit 23 and then, when the input device is connected to an information terminal later, the contents with respect to the stored coordinate values can be displayed through a monitor.

Also, the hybrid coordinate recognition input apparatus according to the present invention can be constructed to have both a display unit and a communication unit so that the device can have both an electronic pen function and a mouse function.

FIG. 3 is a schematic block diagram illustrating an example of an input device for recognizing hybrid coordinates using both an absolute coordinate recognition method and a relative coordinate recognition method according to another embodiment of the present invention. The hybrid coordinate recognition input device of FIG. 3 is composed of a hybrid coordinate sensing unit 41 for obtaining relative coordinate information by sensing the amount of relative movement with respect to the track of the movement of the coordinate input device, and obtaining absolute coordinate information by using the image of a microcode printed on pattern paper through operation of a switch means; a storage unit 42 for storing the absolute coordinate information and relative coordinate information sensed in the coordinate sensing unit 41 and a sensing time; a function key 43 for inputting a command at a predetermined time; a communication unit 45 for transmitting the coordinate information sensed in the hybrid coordinate sensing unit 41 and the command input ted through the function key 43 to an information terminal 50; and a CPU 44 for controlling the functions of all the elements.

Here, with all the information transferred to the information terminal 50 through the communication unit 45, absolute coordinates are obtained from the absolute coordinate information by the operation function of the information terminal 50 itself. Then, by using the obtained absolute coordinates, an operation to complement and correct relative coordinates obtained from the relative coordinate information is performed to generate final absolute coordinate values with respect to the track of handwritten characters or diagrams such that the handwritten characters or diagrams are output on a monitor or a cursor moving on the monitor can be controlled.

Also, the hybrid coordinate sensing unit 41 may be separately composed of an absolute coordinate sensing unit 41A and a relative coordinate sensing unit 41B as explained with reference to FIG. 1, or may further include an optical system having one hybrid imaging system, an image sensor, and an absolute coordinate sensing switch unit. The hybrid coordinate recognition input device thus constructed has a mouse function when connected to an information terminal. Also, the input device stores absolute coordinate information and relative coordinate information with respect to the tracks of handwritten characters or diagrams in a storage unit, and then, when connected to an information terminal, outputs the information to a monitor through a coordinate calculation function of the information terminal.

The hybrid coordinate recognition input device as described above may be implemented in the form of an electronic pen, and uses pattern paper having a pattern in which a predetermined microcode is printed. The pattern paper is divided into cell units and in each cell a microcode having different position information is printed. By using the microcode recognized by the operation of the absolute coordinate recognition switch means, an absolute position of the hybrid coordinate recognition input device is recognized. Also, the hybrid coordinate recognition input device obtains relative coordinates in the entire pattern paper by using an optical type or ball type method.

At this time, the microcode of the pattern paper being used can be formed simpler than that of the pattern paper used by an ordinary absolute coordinate recognition input device, for example, as a line or two points. Here, only an optical system with a resolution that can sense these as different codes is needed. Accordingly, even without placing a separate order for manufacture, users can print and use microcodes by themselves through their computers.

Also, a pen-tip whose operation is determined according to whether an input device is up or down is used as an absolute coordinate sensing switch means to obtain absolute coordinate information in the hybrid coordinate sensing unit 11, 21, and 41. In a pen-down state in which the pen-tip is pressed, a hybrid coordinate sensing unit recognizes relative coordinates and absolute coordinates at the same time, and in a pen-up state in which the pen-tip is not pressed, only relative coordinate information is recognized.

Here, a state in which the pen-tip is pressed and both absolute coordinate information and relative coordinate information are recognized is referred to as pen down, and a state in which the pen-tip is not pressed and only relative coordinate information is recognized is referred to as pen up.

Also, only absolute coordinate information can be made to be recognized in the pen-down state.

A method of obtaining coordinates according to the state of the pen-tip as described above includes: recognizing relative coordinates the instant the hybrid coordinate recognition apparatus is turned on; while recognizing the relative coordinates, if the pen-tip is transited to a pen-down state, recognizing both absolute coordinates and relative coordinates; while both absolute coordinates and relative coordinates are recognized, if the pen-tip is transited to a pen-up state, stopping recognition of absolute coordinates and recognizing relative coordinates; and recognizing coordinates by repeatedly performing the above steps according to the state of the pen-tip.

According to the hybrid coordinate recognition method, only predetermined coordinate recognition result calculated through mutual complementing and correction regardless of errors occurring in the process of recognizing absolute coordinate and relative coordinates is transmitted to a computer so that the cursor on the monitor can be controlled.

Also, the hybrid coordinate recognition input device constructed as described above converts relative coordinates recognized in the hybrid coordinate sensing unit into absolute coordinates by using absolute coordinates recognized in a pen-down state, and by doing so, inputs all the tracks of handwritten characters or diagrams with absolute coordinates in an information terminal and outputs the tracks on a monitor to be used for a method of controlling a cursor on the monitor, or outputs the tracks through a display unit embedded in the input device.

At this time, in respect of an operation for recognizing relative coordinates in the hybrid coordinate recognition input device, while the input device is turned on, the amount of movement of the input device is recognized by the hybrid coordinate sensing unit at a frequency of 1800~6500 times per second and the result is stored in the storage unit 12, 22, and 42.

Also, in order to recognize absolute coordinates, during a pen-down state from a time when the pen-down state begins, a microcode image of pattern paper is obtained at a frequency of at least twice or more per second, this image is stored in the storage unit 12, 22, and 42, and at this time, the time of acquisition can be stored together. This is referred to as storing of absolute coordinate information.

Thus, while relative coordinate information is recognized at a higher frequency, absolute coordinate information is recognized at a lower frequency, and at this time, it is desirable that the periods of the two recognition processes have a multiple relation in which one is a multiple of the other. Also, the recognition of relative coordinate information should be performed continuously regardless of the recognition of absolute coordinates, but synchronization of the two operations should be continuously maintained. In addition, only the relative coordinate recognition method is performed the instant the pen-up state begins, and at this time, the pen-up time is also stored together in the storage unit.

However, even when the input device of the present invention is turned on, if it is determined that the input device is not used, the hybrid coordinate sensing unit may not operate or the recognized amount of movement may not be stored during the unused time. In this case, a time when the input device stops operation and a time when the input device begins operation are stored respectively. Also, while absolute coordinates are recognized in a pen-down state, relative coordinates may be not recognized.

The operations of the hybrid coordinate recognition input device include the steps: recognizing relative coordinates at the instant the input device is turned on; while the relative coordinates are recognized, obtaining absolute coordinates at predetermined intervals by operating an absolute coordinate sensing switch unit; by using the obtained absolute coordinates, converting relative coordinates (relative coordinate information recognized before obtaining absolute coordinate information, relative coordinate information recognizing at the instant absolute coordinate information is obtained, relative coordinates recognized between obtaining absolute coordinates information, or relative coordinates recognized after obtaining absolute coordinate information) into absolute coordinates; and transmitting the absolute coordinates to an information terminal.

At this time, as an embodiment, absolute coordinates are obtained with the pen-tip in a pen-down state in order to control a cursor on a monitor and to write characters or draw diagrams. Since absolute coordinates are obtained at predetermined time intervals, relative coordinates recognized between the time intervals are converted into absolute coordinates such that an accurate track of absolute coordinates can be obtained.

Also, relative coordinates recognized before or after pen-down, i.e., before or after absolute coordinates are recognized are converted into absolute coordinates by using absolute coordinates sensed at the pen-down time such that the track of the input device can be completed.

Hereinafter, a method of converting relative coordinates obtained through the hybrid coordinate recognition input device operating with the structure described above, to absolute coordinate by using absolute coordinates recognized in a pen-down state will be explained in more detail. For this, it is assumed that the hybrid coordinate recognition input device moved along the track illustrated in FIG. 4. Also, the track is an example in which a pen-up operation interval 31 and a pen-down operation interval 32 appear repeatedly.

First, a point at which coordinates are first recognized or the amount of relative movement is first recognized immediately after the hybrid coordinate recognition input device is turned on will be referred to as $P_S$. Since a pen-tip is still in a pen-up state, the amount of movement of relative coordinates instead of absolute coordinates is recognized in relation to $P_S$.

Then, until the pen-tip is transited to a pen-down state, a plurality of points on the track of movement of the input device are sequentially recognized by a relative coordinate recognition method. Next, it is assumed that the point which is first recognized by an absolute coordinate recognition method immediately after the pen-tip is transited to a pen-down state is referred to as $P_1$, and the plurality of points recognized by the relative coordinate recognition method before this point are referred to as $P_{1,-1}$, $P_{1,-2}$, $P_{1,-3}$, ..., $P_{1,-L}$, respectively, in the inverse order from the one closest to $P_1$. Here, since the number of recognized points is assumed as L, the last point expressed in the inverse order is $P_S$. At this time, the amounts of movement recognized at respective points will be referred to as $\Delta R_{1,-1}$, $\Delta R_{1,-2}$, $\Delta R_{1,-3}$, ..., $\Delta R_{1,-L}$, respectively. Since the pen-tip is transited to a pen-down state immediately after point $P_{1,-1}$ is recognized according to the above definition, the absolute coordinate of $P_1$ that is a point immediately next to point $P_{1,-1}$ is recognized by an absolute coordinate recognition method. At this time, the recognized absolute coordinate is referred to as $R_1$.

In order to emphasize that the instant the absolute coordinate of point $P_1$ is recognized the relative coordinate recognition method can also operate in relation to the identical point, point $P_1$ may also be expressed as $P_{1,0}$, and the recognized amount of relative movement is referred to as $\Delta R_{1,0}$.

The amount of relative movement with respect to a point recognized by the relative coordinate recognition method means a displacement from a point immediately before the current point to the current point. For example, $\Delta R_{1,-2}$ is obtained by subtracting absolute coordinate $R'_{1,-3}$ of point $P_{1,-3}$ from absolute coordinate $R'_{1,-2}$ of point as the following equation 1. Here, "'(prime)" indicates that the absolute coordinates of the points are not directly recognized but are obtained by conversion using another correction method.

$$\Delta R_{1,-2} = R'_{1,-2} - R'_{1,-3} \tag{1}$$

If the pen-down state continues after point $P_1$ is recognized with absolute coordinate, absolute coordinates of corresponding points are periodically recognized by an absolute coordinate recognition method at predetermined time intervals. A point whose absolute coordinate $R_2$ is recognized by an absolute coordinate recognition method after point $P_1$ is referred to as $P_2$. Also, in relation to a plurality of points on the track between two points (for example, $P_1$ and $P_2$) that are recognized by an absolute coordinate recognition method, the amounts of relative movement of those points are recognized by a relative coordinate recognition method at a higher frequency. The points recognized by the relative coordinate recognition method after the absolute coordinate of point $P_1$ is recognized are referred to as $P_{1,1}$, $P_{1,2}$, $P_{1,3}$, ..., $P_{1,N}$, respectively. Also, the amounts of movement related to these points are referred to as $\Delta R_{1,1}$, $\Delta R_{1,2}$, $\Delta R_{1,3}$, ..., $\Delta R_{1,N}$, respectively.

Also, the instant the absolute coordinate of point $P_2$ is recognized the relative coordinate recognition method can also operate in relation to the identical point, and in order to emphasize this, point $P_2$ may also be expressed as $P_{2,0}$, and the recognized amount of relative movement is referred to as $\Delta R_{2,0}$.

Likewise, after the absolute coordinate of point $P_2$ is recognized, the points recognized by a relative coordinate recognition method are referred to as $P_{2,1}$, $P_{2,2}$, $P_{2,3}$, ..., $P_{2,N}$, respectively, and the amounts of movement related to these points are referred to as $\Delta R_{2,1}$, $\Delta R_{2,2}$, $\Delta R_{2,3}$, ..., $\Delta R_{2,N}$, respectively.

If the pen-down state continues even after point $P_{2,N}$ is recognized, the absolute coordinate of point $P_3$ will be recognized again by an absolute coordinate recognition method, and a plurality of following points will be recognized by a relative coordinate recognition method. However, if the pen-tip is transited to a pen-up state before a next absolute coordinate recognition method is applied, all the following points are recognized by a relative coordinate recognition method until the pen-tip is transited to a pen-down state again. In this case, the points whose amounts of movement are recognized by the relative coordinate recognition method are referred to as $P_{3,1}$, $P_{3,2}$, $P_{3,3}$, ..., $P_{3,M}$, respectively, and the amounts of movement related to the points are referred to as $\Delta R_{3,1}$, $\Delta R_{3,2}$, $\Delta R_{3,3}$, ..., $\Delta R_{3,M}$, respectively. Here, M is a number generally bigger than N, but may be smaller exceptionally.

If the pen-tip is again transited to a pen-down state immediately after point $P_{3,M}$ is recognized by the relative coordinate recognition method, the position of the input device is immediately recognized by an absolute coordinate recognition method. At this time, the absolute coordinate of point $P_4$ that is recognized with absolute coordinate recognition method is referred to as $R_4$.

According to the method described above, points whose coordinate information is recognized by the absolute coordinate recognition method and the relative coordinate recognition method can be named, and absolute coordinates or the amount of movement of coordinates corresponding to the points can be expressed.

Also, a time period to which the absolute coordinate recognition method is applied is referred to as $T_A$, a time period to which the relative coordinate recognition method is applied is $T_R$, and a time taken for recognizing absolute coordinates by the absolute coordinate recognition method (more accurately, a time taken for obtaining an image for recognition of absolute coordinates) is referred to as $t_A$.

If the absolute coordinate recognition method and the relative coordinate recognition method operate at the same time independently, while the pen-down state is maintained, the absolute coordinate of one point is recognized, and until next absolute coordinate is recognized, recognition of relative coordinates will be repeated N times where $N=\text{int}[T_A/T_R-1]$. Here, int[ ] means that the integer part of a value in the bracket [ ] is obtained. At this time, in the calculation of N, a case in which a relative coordinate method operates at the same time in relation to a point whose absolute coordinate is recognized is not considered.

However, if a relative coordinate recognition method cannot operate while an absolute coordinate recognition method operates, the total frequency N' that relative coordinate recognition is repeated between two events which are recognition of absolute coordinate of one point and recognition of absolute coordinate of a next point while the pen-down state is maintained is given as $N'=\text{int}[(T_A-t_A)/T_R-1]$. That is, for time $t_A$ taken for recognizing absolute coordinate of one point, the amount of relative movement cannot be obtained such that the amounts of relative movement in relation to a total of K points where K=N−N'+1 cannot be obtained.

As described above, absolute coordinates and the amounts of movement of relative coordinates recognized while the hybrid coordinate recognition input device is moving are combined, absolute coordinates of all points are extracted, and the track of movement is converted into absolute coordinates. By doing so, the track of the input device is completed.

The converting of relative coordinates into absolute coordinate by using the obtained absolute coordinates as described above is applied to a case where an error in recognizing coordinates does not occur and recognition of relative coordinates is performed at all positions separately from recognition of absolute coordinates. According to the converting method, absolute coordinate $R'_{1,-1}$ of $P_{1,-1}$ can be converted from absolute coordinate $R_1$ of point $P_1$ recognized by an absolute coordinate recognition method first time after the input device is turned on, and the amount of movement $\Delta R_{1,0}$ recognized by a relative coordinate recognition method with respect to the identical point. In order to distinguish the converted absolute coordinates from absolute coordinates directly recognized by an absolute coordinate recognition method, mark "'(prime)" is added.

From the definition, $\Delta R_{1,0}=R_1-R'_{1,-1}$, of the amount of movement $\Delta R_{1,0}$ recognized by a relative coordinate recognition method in relation to point $P_1$, the converted absolute coordinate $R'_{1,-1}$ of point $P_{1,-1}$ can be obtained as the following equation 2:

$$R'_{1,-1}=R_1-\Delta R_{1,0} \qquad (2)$$

According to the same principle, from the amount of movement $\Delta R_{1,-1}$ recognized by a relative coordinate recognition method in relation to point $P_{1,-1}$, the converted absolute coordinate $R'_{1,-2}$ of point $P_{1,-2}$ can be obtained as the following equation 3:

$$\Delta R_{1,-1}=R'_{1,-1}-R'_{1,-2} \qquad (3)$$

$$\therefore R'_{1,-2}=R'_{1,-1}-\Delta R_{1,-1}$$
$$=R_1-\Delta R_{1,0}-\Delta R_{1,-1}$$

According to the process described above, the converted absolute coordinate $R'_{1,-i}$ of point $P_{1,-i}$ recognized by a relative coordinate recognition method before point $P_1$ can be expressed as the following equation 4:

$$R'_{1,-i}=R_1-\sum_{m=0}^{i-1}\Delta R_{1,-m} \qquad (4)$$

where i is an integer equal to or greater than 1.

According to the method described above, by using the absolute coordinate of point $P_1$ recognized first by an absolute coordinate recognition method, the absolute coordinates of each point recognized by a relative coordinate recognition method after the point $P_1$ can also be converted. Since the amount of movement $\Delta R_{1,1}$ recognized by a relative coordinate recognition method in relation to point $P_{1,1}$ is $\Delta R_{1,1}=R'_{1,1}-R_1$, the converted absolute coordinate of point $P_{1,1}$ can be obtained as the following equation 5:

$$R'_{1,1}=R_1+\Delta R_{1,1} \qquad (5)$$

According to the same method, the converted absolute coordinate $R'_{1,j}$ of point $P_{1,j}$ can be expressed as the following equation 6:

$$R'_{1,j}=R_1+\sum_{m=1}^{j}\Delta R_{1,m} \qquad (6)$$

where j is an integer equal to or greater than 1.

This process can be applied repeatedly to all other points recognized by a relative coordinate recognition method before a second absolute coordinate recognition method operates. However, if the absolute coordinate of point $P_2$ is recognized by an absolute coordinate recognition method, the absolute coordinates of points recognized by a relative coordinate recognition method after this point $P_2$ should be converted based on the absolute coordinate $R_2$ of point $P_2$. For example, the converted absolute coordinate $R'_{2,j}$ of point $P_{2,j}$ are given as the following equation 7:

$$R'_{2,j}=R_2+\sum_{m=1}^{j}\Delta R_{2,m} \qquad (7)$$

where j is an integer equal to or greater than 1.

As described above, if recognition errors of absolute coordinates and relative coordinates do not exist and recognition of relative coordinates is performed at all positions separately from recognition of absolute coordinates, the accurate track of an input device can be obtained by converting the relative coordinates of the track of movement for an interval between recognition of absolute coordinates and the track of movement in a pen-up state into absolute coordinates by using the absolute coordinates recognized in a pen-down state.

However, the converting of relative coordinates into absolute coordinates by using already obtained absolute coordinates as described above can be applied only when recognition errors of absolute coordinates and relative coordinates do not exist and recognition of relative coordinates is performed at all positions separately from recognition of absolute coordinates. Accordingly, the converting method of absolute coordinates to complete the track of an input device can be changed with respect to the type of recognition error of absolute coordinates or relative coordinates as the following.

First, when coordinate recognition errors do not exist but recognition of relative coordinates is not performed while recognition of absolute coordinates, a step of converting relative coordinates that are not recognized into absolute coordinates by using an extrapolation or spline method is further included in a method of driving the hybrid coordinate recognition input device so that the track of the input device can be completed.

Secondly, when errors of recognition of absolute coordinates occur, a step of determining an error of recognition of absolute coordinates by comparing the absolute coordinate of a point recognized by an absolute coordinate recognition method with the absolute coordinates of the identical point converted from the results of other recognitions; and, if an error is determined, a step of correcting the absolute coordinates having the error by using the result of recognition of relative coordinates and the result of recognitions of the absolute coordinates of other points may be further included in the method of driving the hybrid coordinate recognition input device so that the track of the input device can be completed.

Thirdly, when errors of recognition of relative coordinates occur, a step of determining that the input device is gripped with being rotated; and a step of obtaining accurate relative coordinates by correcting the rotation angle that the input device is rotated may be further included in the method of driving the hybrid coordinate recognition input device so that the track of the input device can be completed.

When errors of recognition of absolute coordinates or relative coordinates occur as described above, by using the steps described above separately or in a combined fashion, a variety of errors occurring during the operation of the input device can be processed and through this, an accurate track of the input device can be obtained.

Also, fourthly, when absolute coordinates cannot be obtained because the absolute coordinate sensing unit of the hybrid coordinate recognition input device does not work or pattern paper is seriously damaged or pattern paper cannot be used,
a relative track of the input device can also be obtained by using only relative coordinates recognized by the relative coordinate sensing unit.

Hereinafter, the operations of converting all coordinates into absolute coordinates in order to obtain the track of an input device when the errors of recognition of absolute coordinates or relative coordinates occur will be explained in more detail.

First, when errors of recognition of coordinates do not exist but for time $t_A$ required for recognizing absolute coordinates recognition of relative coordinates is not performed, the method of converting relative coordinates that are not recognized into absolute coordinates by using an extrapolation or spline method will now be explained.

In the method of converting relative coordinates not recognized into absolute coordinates by using the spline method, in order to convert absolute coordinates of points $P_{1,-1}$, $P_{1,-2}$, ..., $P_S$ before point $P_1$ whose absolute coordinate is recognized, and points $P_{1,1}$, $P_{1,2}$, ..., $P_{1,N}$ after point $P_1$, it is assumed that the amounts of relative movement of K points $P_{1,0}$, $P_{1,1}$, ..., $P_{1,K-1}$ whose relative coordinates are not recognized are $\Delta Q_{1,0}$, $\Delta Q_{1,1}$, $\Delta Q_{1,2}$, ..., $\Delta Q_{1,K-1}$, respectively. The amount values of movement are not recognized values but unknown quantities.

With the unknown quantities as references, the converted absolute coordinates of points recognized by a relative coordinate recognition method before point $P_1$ and the converted absolute coordinates of points recognized by a relative coordinate recognition method after point $P_1$ can be obtained. At this time, to the converted absolute coordinates "'" is added in order to distinguish the coordinates from absolute coordinates recognized directly by an absolute coordinate recognition method.

Since the amount of virtual relative movement with respect to point $P_1$ is $\Delta Q_{1,0}$, the converted absolute coordinate $R'_{1,-1}$ of point $P_{1,-1}$ can be expressed as the following equation 8, according to the definition on the amount of relative movement:

$$\Delta Q_{1,0} = R_1 - R'_{1,-1}$$

$$\therefore R'_{1,-1} = R_1 - \Delta Q_{1,0} \qquad (8)$$

If the absolute coordinate of point $P_{1,-1}$ is obtained through conversion, the converted absolute coordinate $R'_{1,-2}$ of point $P_{1,-2}$ can be obtained from the converted result and the amount of movement $\Delta R_{1,-1}$ with respect to point $P_{1,-1}$ recognized by a relative coordinate recognition method, as the following equation 9:

$$\Delta R_{1,-1} = R'_{1,-1} - R'_{1,-2} \qquad (9)$$
$$\therefore R'_{1,-2} = R'_{1,-1} - \Delta R_{1,-1}$$
$$= R_1 - \Delta Q_{1,0} - \Delta R_{1,-1}$$

Through this process the converted absolute coordinate $R'_{1,-i}$ of point $P_{1,-i}$ recognized by a relative coordinate recognition method before point $P_1$ can be obtained as the following equation 10:

$$R'_{1,-i} = R_1 - \Delta Q_{1,0} - \sum_{m=1}^{i-1} \Delta R_{1,-m} \qquad (10)$$

where i is an integer equal to or greater than 2.

According to the same method, the converted absolute coordinates of points recognized by a relative coordinate recognition method after point $P_1$ can be expressed. First, a process of converting K−1 points, excluding $P_{1,0}$, whose amounts of relative movement cannot be recognized will now be explained. Since the amount of virtual relative movement with respect to point $P_{1,1}$ is $\Delta Q_{1,1}$, absolute coordinate $R'_{1,1}$ of point $P_{1,1}$ can be expressed as the following equation 11, according to the definition on the amount of relative movement:

$$\Delta Q'_{1,1} = R'_{1,1} - R_1$$

$$\therefore R'_{1,1} = R_1 + \Delta Q_{1,1} \qquad (11)$$

If the absolute coordinate of point $P_{1,1}$ is obtained through conversion, the converted absolute coordinate $R'_{1,2}$ of point $P_{1,2}$ can be obtained from the converted result and the amount of virtual relative movement $\Delta Q_{1,2}$ with respect to point $P_{1,2}$ as the following equation 12:

$$\Delta Q_{1,2} = R'_{1,2} - R'_{1,1} \quad (12)$$

$$\therefore R'_{1,2} = R'_{1,1} + \Delta Q_{1,2}$$
$$= R_1 + \Delta Q_{1,1} + \Delta Q_{1,2}$$

According to the process described above, generalized values of converted absolute coordinates with respect to a finite number of points whose amounts of relative movement cannot be recognized after point $P_1$ can be expressed as the following equation 13:

$$R'_{1,j} = R_1 + \sum_{m=1}^{j} \Delta Q_{1,m} \quad (13)$$

where j is an integer equal to or greater than 1 and equal to or less than K−1.

Since the converted absolute coordinates with respect to K−1 points after $P_1$ recognized by the absolute coordinate recognition method are thus obtained by using the amount of virtual relative movement, the expression of absolute coordinates with respect to points whose amounts of relative movements are recognized by a practical relative coordinate recognition method after point $P_1$ can be obtained. In this case, since the amount of relative movement with respect to the first point $P_{1,K}$ is $\Delta R_{1,K}$, the converted absolute coordinate $R'_{1,K}$ of point $P_{1,K}$ can be expressed as the following equation 14:

$$\Delta R_{1,K} \; R'_{1,K} - R'_{1,K-1} \quad (14)$$

$$\therefore R'_{1,K} = R'_{1,K-1} + \Delta R_{1,K}$$
$$= R_1 + \sum_{m=1}^{K-1} \Delta Q_{1,m} + \Delta R_{1,K}$$

According to the process described above, the converted absolute coordinates of points $P_{1,K+1}, P_{1,K+2}, \ldots P_{1,N}$ recognized by a relative coordinate recognition method after point $P_{1,K}$ are expressed as the following equation 15:

$$R'_{1,j} = R_1 + \sum_{m=1}^{K-1} \Delta Q_{1,m} + \sum_{i=K}^{i} \Delta R_{1,i} \quad (15)$$

where j is an integer equal to or greater than K and equal to or less than N.

By assuming the amounts of relative movement with respect to the finite number (K) of points whose relative coordinates cannot be recognized, the converted absolute coordinates with respect to a total of M points before point $P_1$ and a total of N points after point $P_1$ can be obtained. However, since these include 2K unknown quantities (the amounts of relative movement with respect to K points), the unknown quantities should be determined by using interpolation so that a total of M+1+N points make a continuous and smooth curve.

Next, according to a method of converting relative coordinate information that cannot be recognized into absolute coordinates by using an extrapolation method, the amounts of relative movement, $\Delta Q_{1,0}, \Delta Q_{1,1}, \Delta Q_{1,2}, \ldots, \Delta Q_{1,K-1}$, with respect to K points, $P_{1,0}, P_{1,1}, \ldots, P_{1,K-1}$, whose relative coordinates cannot be recognized can be estimated. First, from an amount of movement obtained through a relative coordinate recognition method between two events which are recognition of absolute coordinate of one point and recognition of absolute coordinate of a next point while a pen-down state is maintained, the track of relative coordinates is obtained. At this time, assuming that the initial starting point of the track is (0,0), the positions of points after point $P_1$ whose amounts of relative movement are recognized by a practical relative coordinate recognition method are determined. The position of a first point $P_{1,K}$ on the relative coordinate track is expressed as the following equation 16:

$$\overline{R}'_{1,K} = (0, 0) + \Delta R_{1,K} \quad (16)$$

where 'bar(−)' on top of $R'_{1,K}$ means coordinates indicating the track of relative coordinates. According to this procedure, the respective positions of other points on the relative coordinate track are given as the following equation 17:

$$\overline{R}'_{1,j} = (O, O) + \sum_{i=K}^{i} \Delta R_{1,i} \quad (17)$$

where j is an integer equal to or greater than K and equal to or less than N.

After completing the track of relative coordinates through the process described above, a polynomial expression accurately connecting coordinate values (x,y) of several initial points on the track is obtained. At this time, a polynomial explaining the relationship between each time point when relative coordinates are recognized and x coordinates on the relative coordinate track and a polynomial explaining the relationship between each time point when relative coordinates are recognized and y coordinates on the relative coordinate track are obtained, and this process is referred to as extrapolation or interpolation in the field of numerical analysis. By substituting a time whose relative coordinates cannot be recognized in the two polynomial expressions, the amounts of relative movement $\Delta Q_{1,0}, \Delta Q_{1,1}, \Delta Q_{1,2}, \ldots, \Delta Q_{1,K-1}$, with respect to K points, $P_{1,0}, P_{1,1}, \ldots, P_{1,K-}$, whose relative coordinates cannot be recognized are determined. If this process is completed, by adding the amounts of relative movement of K points whose relative coordinates cannot be recognized, to the relative coordinate track obtained above, the track of relative coordinates is finally completed.

Finally, since both end points of the relative coordinate track obtained above should match two points recognized by the absolute coordinate method, by using this, the track of relative coordinates can be converted into a track of absolute coordinates through a simple proportional relationship. By doing so, the absolute coordinates of all points between two events which are recognition of absolute coordinate of one point and recognition of absolute coordinate of a next point can be obtained through conversion.

Secondly, when errors of recognition of absolute coordinates occur, the error of recognition of absolute coordinates is determined by comparing the absolute coordinate of a point recognized by an absolute coordinate recognition method with the absolute coordinates of the identical point estimated from the results of other recognitions. If an error is determined, the absolute coordinate of point $P_2$ is corrected by using the result of recognition of relative coordinates and the result of recognitions of the absolute coordinates of other points.

For example, in a process of determining an error of recognizing the absolute coordinates of point $P_2$, the absolute coordinates, $R_1$ and $R_3$, of points $P_1$ and $P_3$ that are recognized by an absolute coordinate recognition method before and after $P_2$, the amounts of movement, $\Delta R_{1,0}$, $\Delta R_{1,1}$, $\Delta R_{1,2}$, $\Delta R_{1,3}$, ..., $\Delta R_{1,N}$, recognized by a relative coordinate recognition method in an interval between points $P_1$ and $P_2$, and the amounts of movement, $\Delta R_{2,0}$, $\Delta R_{2,1}$, $\Delta R_{2,2}$, $\Delta R_{2,3}$, ..., $\Delta R_{2,N}$, recognized by a relative coordinate recognition method in an interval between points $P_2$ and $P_3$ are used.

First, as in equation 6, if the converted absolute coordinate $R'_{1,N}$ of point $P_{1,N}$ is obtained by using the absolute coordinate of point $P_1$ and the amount of movement recognized by a relative coordinate recognition method in the interval between points $P_1$ and $P_2$, the result is $$R'_{1,N} = R_1 + \sum_{m=1}^{N} \Delta R_{1,m}.$$

By using this result and an expression $\Delta R_{2,0} = (R_2)^{(1)} - R'_{1,N}$ defining the amount of movement $\Delta R_{2,0}$ recognized by a relative coordinate recognition method at point $P_2$, the converted absolute coordinate $(R'_2)^{(1)}$ of point $P_2$ can be obtained as the following equation 18. At this time, since the converted absolute coordinate of point $P_2$ is calculated on the basis of point superscript (1) is added so that it can be distinguished from a result originally recognized by an absolute coordinate recognition method.

$$(R_2)^{(1)} = R'_{1,N} + \Delta R_{2,0} \qquad (18)$$
$$= R_1 + \sum_{m=1}^{N} \Delta R_{1,m} + \Delta R_{2,0}$$

In a method similar to this, by using the absolute coordinate of point $P_3$ and the amount of movement recognized by a relative coordinate recognition method in the interval between points $P_2$ and $P_3$, the converted absolute coordinate $(R'_2)^{(3)}$ of point $P_2$ can be obtained. At this time, since the converted absolute coordinate of point $P_2$ is calculated on the basis of point $P_3$, superscript (3) is added so that it can be distinguished from a result originally recognized by an absolute coordinate recognition method. First, if the converted absolute coordinate $R'_{2,N}$ of $P_{2,N}$ are obtained with point $P_2$ as a reference, the result is $$R'_{2,N} = (R_2)^{(3)} + \sum_{m=1}^{N} \Delta R_{2,m}.$$

By using this result and an expression $\Delta R_{3,0} = R_3 - R'_{2,N}$ defining the amount of movement $\Delta R_{3,0}$ recognized by a relative coordinate recognition method at point $P_3$, the converted absolute coordinate $(R'_2)^{(3)}$ of point $P_2$ can be obtained as the following equation 19:

$$\Delta R_{3,0} = R_3 - R'_{2,N} \qquad (19)$$
$$= R_3 - (R_2)^{(3)} - \sum_{m=1}^{N} \Delta R_{2,m}$$
$$\therefore (R_2)^{(3)} = R_3 - \Delta R_{3,0} - \sum_{m=1}^{N} \Delta R_{2,m}$$

Thus, after obtaining the converted absolute coordinate of $P_2$ with reference to points $P_1$ and $P_3$, respectively, before and after point $P_2$, the results are compared with the absolute coordinate of point $P_2$ recognized by an absolute coordinate recognition method. Then, the deviation between the absolute coordinate of point $P_2$ and the converted absolute coordinate of $P_2$ with reference to point $P_1$ is defined as $\delta_{21} = |R_2 - (R'_2)^{(1)}|$, and the deviation between the absolute coordinate of point $P_2$ and the converted absolute coordinate of $P_2$ with reference to point $P_3$ is defined as $\delta_{23} = |R_2 - (R'_2)^{(3)}|$. When the precision of recognition of absolute coordinates is $\epsilon$ (the same value as an interval between microcode cells), if each deviation satisfies $\delta_{21} < 1.5\epsilon$ and $\delta_{23} < 1.5\epsilon$, it is determined that all the absolute coordinates recognized by an absolute coordinate recognition method with respect to points $P_1$, $P_2$, and $P_3$ do not have errors. However, if $\delta_{21} \geq 1.5\epsilon$ and $\delta_{23} < 1.5\epsilon$, it is determined that the absolute coordinate of point $P_1$ has an error. Similarly, if $\delta_{21} < 1.5\epsilon$ and $\delta_{23} \geq 1.5\epsilon$, it is determined that the absolute coordinate of point $P_3$ has an error. However, if both of the two deviations are greater than $1.5\epsilon$, all three points may have recognition errors or point $P_2$ may have a recognition error. Also, by applying the method describe above to points $P_2$, $P_3$, and $P_4$ repeatedly, recognition errors of point $P_2$ can be determined.

If a recognition error of the absolute coordinate of a point is determined according to the method described above, the error can be corrected from the result. As in the example described above, if a recognition error of the absolute coordinate of point $P_1$ occurs, the error can be corrected by replacing the absolute coordinate $R_1$ of point $P_1$ with $(R'_1)^{(2)}$. If a recognition error of the absolute coordinate of point $P_2$ occurs, the error can be corrected by replacing the absolute coordinate $R_2$ of point $P_2$ with $(R'_2)^{(1)}$ or $(R'_2)^{(3)}$.

As described above, when absolute coordinates matches the converted absolute coordinates of relative coordinates by using the absolute coordinates, an accurate track can be drawn, and even though an error of recognition of absolute coordinates occurs, an accurate track can be obtained through error determination and correction processes. Also, when it is determined that an error occurs in the absolute coordinate of a point, the converted absolute coordinate of a point whose relative coordinates is recognized can be corrected again with reference to corrected absolute coordinates.

Thirdly, when errors of recognition of relative coordinates occur, a method of determining that the input device is gripped with being rotated, and obtaining accurate relative coordinates by correcting the rotation angle will now be explained. While there is no error in the process itself of recognizing relative coordinates by an input device, a relative motion may be recognized incorrectly because the gripping of the input device is incorrect. If the gripping of the input device is incorrect, the input device itself is rotated (rotating about its axis) such that when the input device is moved in the horizontal direction, the input device is recognized as moving along a slant line.

This problem can be corrected by identifying in the process of recognizing absolute coordinates to what degrees a microcode printed on the paper is rotated relatively about an image sensor. For example, if it is determined in the process of recognizing the absolute coordinate of point $P_2$ that the microcode is rotated by θ degrees relative to the horizontal direction, the amount of movement $\Delta R_{2,j}$ of each point recognized by a relative coordinate recognition method after point $P_2$ can be converted into $\Delta R'_{2,j}$ through correction of a rotation angle as the following equation 20:

$$\Delta R_{2,j} = (\Delta x_{2,j}, \Delta y_{2,j}) \quad (20)$$

$$\begin{bmatrix} \Delta x'_{2,j} \\ \Delta y'_{2,j} \end{bmatrix} = \begin{bmatrix} \cos\theta & -\sin\theta \\ \sin\theta & \cos\theta \end{bmatrix} \begin{bmatrix} \Delta x_{2,j} \\ \Delta y_{2,j} \end{bmatrix}$$

$$\wedge R'_{2,j} = (\wedge x'_{2,j}, \wedge y'_{2,j})$$

Fourthly, when a microcode on pattern paper is damaged, or a microcode cannot be seen because of a memo written on pattern paper, or an absolute error exists in recognition of absolute coordinates or absolute coordinates cannot be recognized because an absolute coordinate sensing unit does not work, by stopping an operation of recognizing absolute coordinates and by operating the input device with only relative coordinates, a track of the input device can be completed.

According to the hybrid coordinate recognition input device and the method of recognizing coordinates of the input device of the present invention, methods of recognizing absolute coordinates and relative coordinates are used together. In a pen-down state, absolute coordinates are recognized and calculated, and in a pen-up state, only relative coordinates are recognized and converted into absolute coordinates, and the converted absolute coordinates are used as coordinates of the input device. By doing so, a hybrid coordinate recognition input device having the advantages of the absolute coordinate recognition method and relative coordinate recognition method is provided. When connected to an information terminal, the input device outputs already stored characters or diagrams through a monitor or performs a mouse function. Also, as an independent device, the input device allows a memo, such as handwritten characters or diagrams, to be confirmed through its own display whenever or wherever it is needed.

While the present invention has been particularly shown and described with reference to exemplary embodiments thereof, it will be understood by those of ordinary skill in the art that various changes in forms and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of recognizing coordinates using a hybrid coordinate recognition input device in which a variety of commands, characters, and diagrams are input and stored or output, the input device including:

a hybrid coordinate sensing unit for obtaining the absolute coordinates with respect to position of the input device, and obtaining relative coordinates by sensing an amount of relative movement with respect to a moving track; and a coordinate calculation unit for obtaining the absolute coordinates and the relative coordinates and converting the obtained relative coordinates into converted absolute coordinates;

the method comprising:

recognizing the relative coordinates the instant the input device is turned on;

if an absolute coordinate sensing switch means operates in the process of recognizing the relative coordinates, obtaining the absolute coordinates at predetermined time intervals and if the absolute coordinate sensing switch means does not operate, obtaining only the relative coordinates; and calculating the converted absolute coordinates by using the obtained said absolute coordinates, converting the relative coordinate information into the converted absolute coordinates;

wherein the relative coordinates are at least one selected among relative coordinates recognized before obtaining absolute coordinates, relative coordinates recognized at the instant the absolute coordinates are obtained, and relative coordinates recognized after obtaining the absolute coordinates; and wherein in the converting of the relative coordinates, the relative coordinates are converted into the converted absolute coordinates by using the following equation:

$$R'_{1,j} = R_1 + \sum_{m=1}^{j} \Delta R_{1,m} \text{ or } R'_{1,-j} = R_1 - \sum_{m=1}^{i-1} \Delta R_{1,-m}$$

where $R'_{1,j}$, and $R'_{1,-j}$ are converted absolute coordinates, $R_1$ is the absolute coordinate of a reference point recognized by an absolute coordinate recognition method, $\Delta R_{1,m}$, and $\Delta R_{1,-m}$ are the amounts of movement recognized by a relative coordinate recognition method, and j is an integer equal to or greater than 1.

2. The method of claim 1, wherein the hybrid coordinate sensing unit comprises:

an absolute coordinate sensing unit having an absolute coordinate sensing switch means determining whether or not to operate in order to obtain the absolute coordinates so that the absolute coordinates are recognized; and a relative coordinate sensing unit capable of continuously obtaining the relative coordinates the instant the input device is turned on.

3. The method of claim 2, wherein the hybrid coordinate sensing unit comprises:

an optical system having a hybrid imaging system;

an image sensor; and an absolute coordinate sensing switch means allowing a microcode image printed on pattern paper to be obtained through the optical system and the image sensor.

4. The method of claim 3, wherein the absolute coordinate sensing switch means is a pen-tip to obtain the absolute coordinates in a down operation in which the pressure of contact with a ground surface is sensed.

5. The method of claim 2, wherein the absolute coordinate sensing switch means is a pen-tip to obtain the absolute coordinates in a down operation in which the pressure of contact with a ground surface is sensed.

6. The method of claim 2, wherein the absolute coordinate sensing unit senses the absolute coordinates at a frequency at least twice per second while the absolute coordinate switch means operates.

7. The method of claim 2, wherein the absolute coordinate sensing unit obtains the absolute coordinates through a tablet method or an ultrasonic method.

8. The method of claim 1, wherein the coordinate calculation unit corrects an error of the absolute coordinates by using the relative coordinates, or corrects an error of the obtained relative coordinates by using the converted absolute coordinates.

9. The method of claim 1, further comprising:
a storage unit storing the relative coordinates and/or the absolute coordinates obtained in the hybrid coordinate sensing unit, sensing time, and the converted absolute coordinates obtained in the coordinate calculation unit;
a function key inputting a command at predetermined coordinates obtained through the coordinate calculation unit;
a communication unit transmitting the converted absolute coordinates calculated in the coordinate calculation unit and/or the command input through the function key to the main body of a computer; and
a central processing unit (CPU) controlling the function of each element.

10. The method of claim 9, further comprising a display unit outputting the converted absolute coordinates with respect to the track of handwritten characters or diagrams obtained in the coordinate calculation unit.

11. The method of claim 1, further comprising a display unit outputting the converted absolute coordinates with respect to the track of handwritten characters or diagrams obtained in the coordinate calculation unit.

12. The method of claim 1, wherein in the converting of the relative coordinates into the converted absolute coordinates by using the obtained said absolute coordinates, if an error of recognition of the absolute coordinates occurs, the method further comprises:
determining an error of recognition of the absolute coordinate by comparing the obtained said absolute coordinate with the converted absolute coordinates of the identical point converted from the results of recognition of the relative coordinates; and
if an error is determined, correcting the absolute coordinate that is determined to have the error, by using the result of recognition of the relative coordinates and the result of recognitions of the absolute coordinates of other points.

13. The method of claim 1, wherein in the converting of the relative coordinates into the converted absolute coordinates by using the obtained said absolute coordinates, if an error of recognition of the relative coordinates occurs, the method further comprises:
determining that the input device is gripped with being rotated; and
obtaining accurate said relative coordinates by correcting the rotation angle that the input device is rotated.

14. A method of recognizing the coordinates using a hybrid coordinate recognition input device having a relative coordinate sensing unit and an absolute coordinate sensing unit, wherein if the absolute coordinate sensing unit does not work, the track of the input device is obtained by using only relative coordinates recognized by the relative coordinate sensing unit, said method comprising converting of the relative coordinates into converted absolute coordinates by using the following equation:

$$R'_{1,j} = R_1 + \sum_{m=1}^{j} \Delta R_{1,m} \text{ or } R'_{1,-j} = R_1 - \sum_{m=1}^{i-1} \Delta R_{1,-m}$$

where $R'_{1,j}$, and $R'_{1,-j}$ are converted absolute coordinates, $R_1$ is the converted absolute coordinate of a reference point recognized by an absolute coordinate recognition method, $\Delta R_{1,m}$, and $\Delta R_{1,-m}$, are the amounts of movement recognized by a relative coordinate recognition method, and j is an integer equal to or greater than 1.

15. A method or recognizing coordinates using a hybrid coordinate recognition input device which is connected to an information terminal to input a variety of commands and handwritten characters, or diagrams by using a cursor displayed on a monitor, the input device including:
a hybrid coordinate sensing unit for obtaining absolute coordinates by using an image of a microcode printed on pattern paper, and obtaining relative coordinates by sensing an amount of relative movement with respect to a moving track of the input device;
a storage unit storing the absolute coordinates and/or the relative coordinates obtained in the hybrid coordinate sensing unit, and a coordinate sensing time;
a function key wherein a command is input at a predetermined time;
a communication unit transmitting the absolute coordinates and the relative coordinates obtained in the hybrid coordinate sensing unit, and the command input through the function key to the information terminal;
a CPU controlling functions of an absolute coordinate sensing unit, a relative coordinate sensing unit, the storage unit, the function key and the communication unit;
wherein the converted absolute coordinate are calculated by a coordinate calculation unit embedded in the information terminal from the absolute coordinates transmitted by the communication unit, the relative coordinates are converted in the converted absolute coordinates by using the absolute coordinates, and by using the converted absolute coordinates, a cursor on the monitor is controlled;
the method comprising:
recognizing the relative coordinates the instant the input device is turned on;
if an absolute coordinate sensing switch means operates in the process of recognizing the relative coordinates, obtaining the absolute coordinates at predetermined time intervals and if the absolute coordinate sensing switch means does not operate, obtaining only the relative coordinates; and
calculating the converted absolute coordinates by using the obtained said absolute coordinates, converting the relative coordinate information into the converted absolute coordinates;
wherein the relative coordinates are at least one selected among relative coordinates recognized before obtaining absolute coordinates, relative coordinates recognized at the instant the absolute coordinates are obtained, and relative coordinates recognized after obtaining the absolute coordinates; and
wherein in the converting of the relative coordinates, the relative coordinates are converted into the converted absolute coordinates by using the following equation:

$$R'_{1,j} = R_1 + \sum_{m=1}^{j} \Delta R_{1,m} \text{ or } R'_{1,-j} = R_1 - \sum_{m=1}^{i-1} \Delta R_{1,-m}$$

where $R'_{1,j}$ and $R'_{1,-j}$ are converted absolute coordinates, $R_1$ is the absolute coordinate of a reference point recognized by an absolute coordinate recognition method, $\Delta R_{1,m}$, and $\Delta R_{1,-m}$ are the amounts of movement recognized by a relative coordinate recognition method, and j is an integer equal to or greater than 1.

16. The method of claim 15, wherein in the converting of the relative coordinates into the converted absolute coordinates by using the absolute coordinates, if recognition of the relative coordinates is not performed while the recognition of the absolute coordinates is performed, converting of the relative coordinates that are not recognized into the converted absolute coordinates is further performed by using an extrapolation or spline method.

17. The method of claim 16, wherein the method of converting into the converted absolute coordinates by the spline method comprises:
    converting the relative coordinates of a point that is not recognized into the converted absolute coordinates by adding the amount of virtual relative movement to a reference absolute coordinate is recognized as the converted absolute coordinate;
    converting the relative coordinates of points that are not recognized into the converted absolute coordinates by adding the amount of virtual movement with respect to K points and the amount of movement recognized by a relative coordinate recognition method to the reference absolute coordinate recognized by an absolute coordinate recognition method; and
    by determining the amounts of virtual movement with respect to the converted absolute coordinates of each point through an interpolation method, finally obtaining the converted absolute coordinates.

18. The method of claim 16, wherein the method of converting into the absolute coordinates by the extrapolation method comprises:
    determining the amounts of relative movement with respect to a finite number of points whose said relative coordinates are not recognized by an extrapolation or interpolation method of numerical analysis;
    completing the track of the relative coordinates by adding the amounts of relative movement of the finite number of points whose said relative coordinates are not recognized, to the determined track of the relative coordinates; and
    converting the completed track of the relative coordinates into the converted absolute coordinates through a simple proportional relationship.

* * * * *